United States Patent [19]

Schilling

[11] Patent Number: 5,076,046

[45] Date of Patent: Dec. 31, 1991

[54] HARVESTER FOR VINE CROPS

[76] Inventor: Clinton Schilling, Rte. 3, Lockwood, Mo. 65682

[21] Appl. No.: 621,023

[22] Filed: Dec. 3, 1990

[51] Int. Cl.$^5$ .................... A01D 25/04; A01D 46/00; A01D 51/00

[52] U.S. Cl. .................... 56/327.1; 56/16.5; 171/128

[58] Field of Search .................... 56/327.1, 13.5, 14.6, 56/14.5, 56/16.5, 220, 226, 344, DIG. 19; 171/31, 128, 129, 61

[56] References Cited

U.S. PATENT DOCUMENTS

| | | | |
|---|---|---|---|
| 2,529,180 | 11/1950 | Oehler | 56/14.5 X |
| 2,644,292 | 7/1953 | Oberholtz et al. | 56/14.5 X |
| 2,701,634 | 2/1955 | Carroll | 56/14.5 X |
| 3,347,031 | 10/1967 | De Long et al. | 56/327.1 |
| 3,365,869 | 1/1968 | Whiteley | 56/327.1 |
| 3,416,298 | 12/1968 | Erdman | 56/327.1 |
| 3,457,711 | 7/1969 | Eisenberg | 56/327.1 |
| 3,511,038 | 5/1970 | Gates et al. | 56/327.1 |
| 3,518,818 | 7/1970 | Porter | 56/327.1 |
| 3,521,710 | 7/1970 | Tillotson | 171/61 |
| 3,527,304 | 9/1970 | Wilde et al. | 171/28 |
| 3,536,140 | 10/1970 | Looker | 171/61 |
| 3,581,484 | 6/1971 | Gilbert | 56/327.1 |
| 3,600,882 | 8/1971 | Eisenberg | 56/327.1 |
| 3,603,067 | 9/1971 | Wilde | 56/327.1 |
| 3,646,742 | 3/1972 | Knutson | 56/327.1 |
| 4,553,381 | 11/1985 | Sonnenberg | 56/327.1 |
| 4,697,406 | 10/1987 | Whitley | 56/327.1 |
| 4,970,849 | 11/1990 | Friesen | 56/344 X |

Primary Examiner—Stephen J. Novosad
Attorney, Agent, or Firm—Kokjer, Kircher, Bowman & Johnson

[57] ABSTRACT

A harvester is provided for mechanized harvesting of vine crops such as cucumbers. A harvester head is provided with a plurality of rollers, each of which comprises a cage structure rotatable about a central longitudinal axis, a rotatable shaft within the cage structure and extending generally parallel to but offset from the longitudinal axis of the cage structure, and a plurality of fingers mounted to the shaft and extending radially outward through the cage structure. Because the shaft and the cage structure rotate about offset axes, the extension of the fingers beyond the cage structure varies along the rotational arc of the roller. The rollers are preferably mounted to provide maximum extension of the fingers during lifting of the vine mat and crop. Belts on the forward roller are spaced apart to permit dispersion of soil picked up with the vine mat.

15 Claims, 4 Drawing Sheets

HARVESTER FOR VINE CROPS

BACKGROUND OF THE INVENTION

This invention relates in general to crop harvesting machines and, more particularly, to a header adapted for harvesting vine crops.

Vine crops such as cucumbers have traditionally been harvested using field workers to hand pick the crop as it matures. Because of the labor intensive nature of manual picking, increased attention has been directed to the use of machines to harvest such crops. Mechanized harvesters which have heretofore been used generally include a cutting blade which severs the vines at or below the ground surface. A rotating forward roller with projecting fingers picks up the severed vine mat and additional rotating rollers or conveyors then transport the vine and crop to devices such as closely spaced pinch rollers which separate the crop from the vine. The crop is then conveyed to a hopper attached to the harvesting machine and the vines are returned to the field.

Mechanized harvesting of this type is known as once-over or single-pass harvesting as the entire crop is harvested and the vines are destroyed during passage of the harvester. Since only one crop is obtained from each vine growth, it is critical that the harvesting machine operate with the utmost efficiency and reliability to maximize crop yield. Yet, many conventional machines experience an unacceptable loss of as much as a third of the crop during harvesting operations. These losses generally occur as the crop is dislodged by the sudden lifting action of the rotating fingers lifting of the vine from the ground and as the vine is conveyed rearwardly along adjacently positioned rotating rollers.

In an attempt to reduce crop losses during pick up and transport of the vine mat, some conventional machines use reciprocating or pivoting fingers to achieve greater extension of the fingers during lifting of the vine. The fingers extend or pivot outwardly to their maximum extension along their upward rotation arc to provide more reliable support for the crop. The fingers then retract along their downward rotation arc to permit closer positioning of the adjacent roller. The pivoting of the fingers however, increases the rotational speed of the fingers and increases crop losses during lifting of the vine mat from the ground. The reliability of the cams, bushings and other mechanisms required to operate fingers of this type has also proven to be less than desired, due in large measure to the wear caused by the dirt, rocks and other debris encountered during operation.

Dirt which is carried onto the conveyor with the vine roots also adversely affects the performance of conventional harvesting heads. Especially during wet field conditions, the soil is not adequately dispersed from the harvester head and the conveyor mechanism becomes plugged and/or other components become fouled. Under such conditions, the harvesting operations must be frequently halted for cleaning of the harvester or inefficient transfer and separation of the crop from the vine as well as increased risk of mechanical breakdown will result. A need has thus developed for an efficient and reliable harvesting head which operates with minimum maintenance even under adverse conditions which may be encountered during harvesting operations.

SUMMARY OF THE INVENTION

It is an object of this invention to provide a vine crop harvester which minimizes crop losses during harvesting operations so that greater crop yields may be obtained in comparison with yields obtainable with conventional harvesters.

It is also an object of this invention to provide a harvester head with rotating fingers which project from the rollers a greater amount during a portion of their rotation arc but which are fixedly secured to their mount so that they operate with a minimum of maintenance and with fewer breakdowns than conventional fingers.

It is a further object of this invention to provide a harvester head with a forward pickup roller which lifts the vine mat from the ground surface with a minimum of disruption of the vine to reduce crop losses as the vine mat is carried onto the harvester.

It is a still further object of this invention to provide a harvester head with rollers which are effective for conveying and thinning the vine mat but which also increase crop yield by reducing the opportunity for the crop to be lost by falling through the spacing between the rollers.

It is still another object of the invention to provide a harvester head with rollers which present the vine mat to the pinch rollers in a uniform manner so that the pinch rollers may effectively separate the crop from the vine mat.

It is yet another object of this invention to provide a harvester head which effectively disperses soil which is carried onto the forward pickup roller with the vine roots, thereby reducing the mechanical wear and failure of the harvester components which would otherwise be caused by the soil.

To accomplish these and other related objects of the invention, a harvester head is provided with a forward roller comprising a cage structure which is rotatable about a longitudinal axis and an independently rotatable shaft which is positioned within the cage structure. The shaft mounts a plurality of finger elements which extend through and beyond the cage structure.

The shaft is offset from but generally parallel to the rotation axis of cage structure so that the extension of the fingers beyond the cage structure varies as the shaft and cage structure rotate. This variation in finger extension allows the roller to be mounted so that maximum extension of the fingers is achieved as the fingers engage the vine mat on the ground surface. As the vine mat is carried onto the roller, the extension of the fingers is reduced, thereby reducing disruption of the crop by decreasing the arc through which the vine mat travels. Adjacently positioned rollers may be constructed similarly to the forward roller to more efficiently convey the crop along the harvester head.

The cage structure of the forward pickup roller may also be provided with a plurality of fixed conveyor belts which are spaced apart to allow soil picked up with the vine mat to fall through the cage structure while still providing effective transfer of the vine mat to the adjacent rollers.

BRIEF DESCRIPTION OF THE DRAWINGS

In the drawings in which like reference numerals are used to indicate like parts in the various views.

DESCRIPTION OF THE PREFERRED EMBODIMENT

Figure 1:
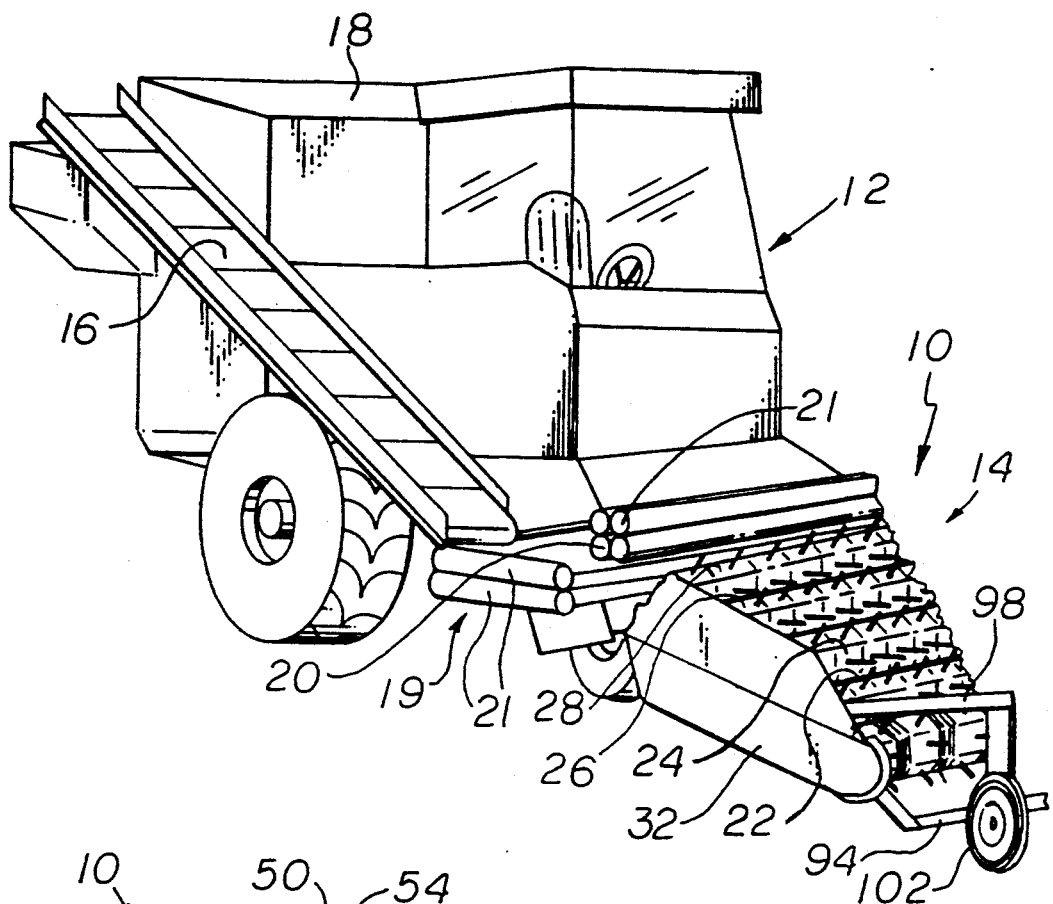
FIG. 1 is a side perspective view of a harvesting machine of the present invention with a portion of the machine shown in fragment.

Referring now to the drawings in greater detail and initially to FIG. 1, a harvesting machine of the present invention is represented broadly by the numeral 10. The harvesting machine 10 comprises a tractor 12 and a forward harvesting head 14 which is coupled with and powered by the tractor. A side conveyor 16 is also mounted to tractor 12 and extends from a rear portion of the harvesting head 14 to a hopper 18 which is positioned to the rear of the tractor.

Another conveyor system 19 is attached to the rear of the harvesting head 14. Conveyor system 19 comprises an endless belt conveyor 20 and sets of pinch rollers 21 which cooperate to separate the crop from the vine for subsequent transfer to conveyor 16 and transport to hopper 18.

The components of conveyor system 19 are generally of conventional construction and need not be described in detail herein. Likewise, tractor 12, side conveyor 16 and hopper 18 are of known construction and their description is unimportant to an understanding of the present invention, which resides generally in the construction and operation of the harvesting head 14.

Figure 2:
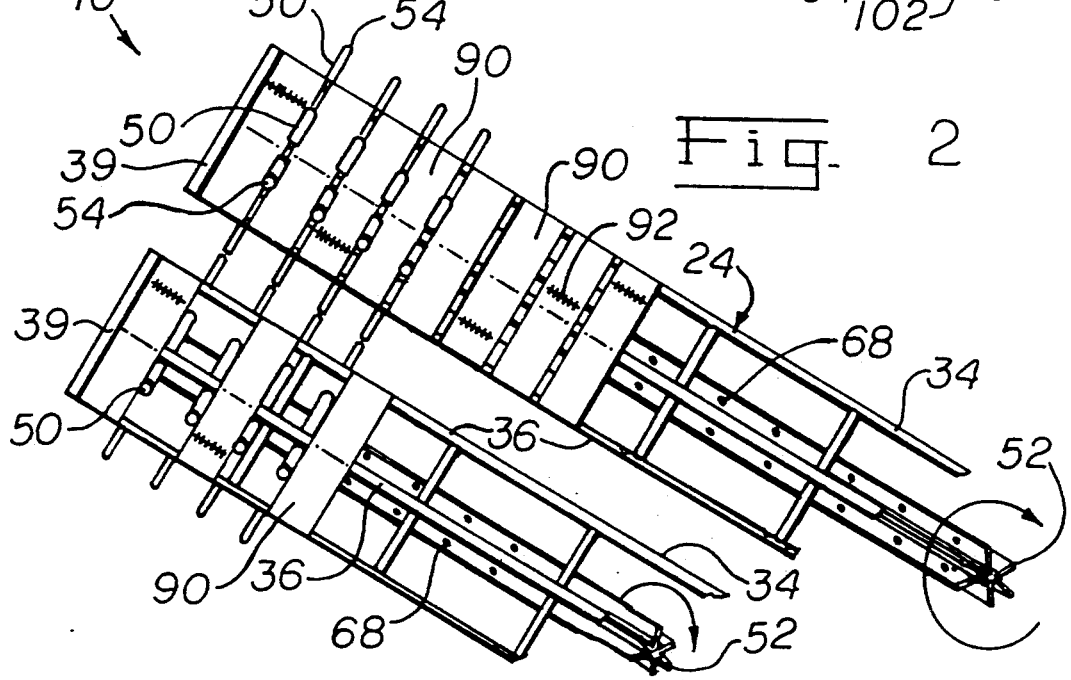
FIG. 2 is a fragmentary top plan view of the forward two rollers of the harvesting head, shown on an enlarged scale and with portions of the rollers removed for purposes of illustration.
Figure 3:
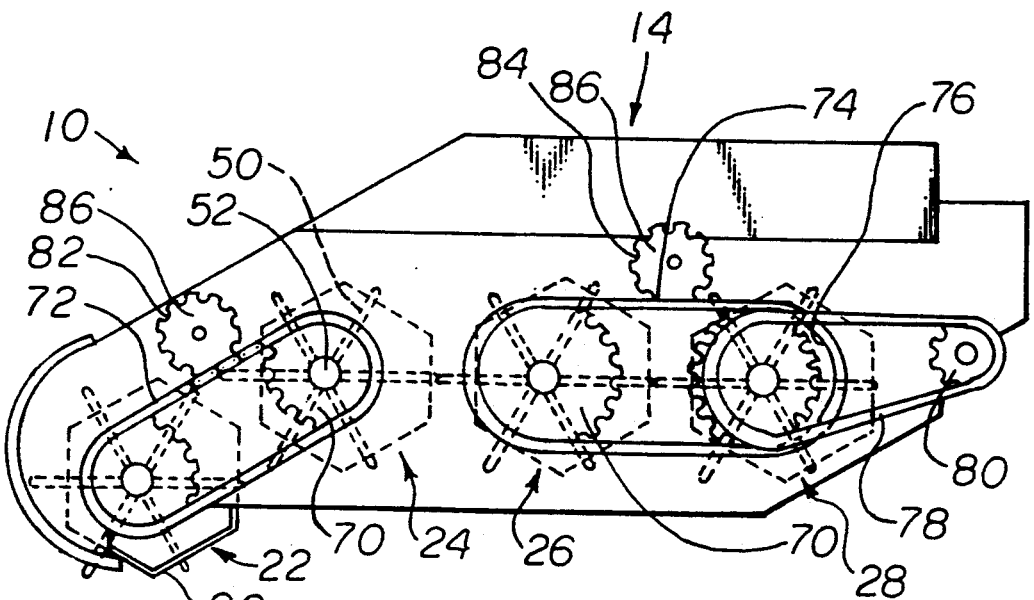
FIG. 3 is a side elevational view of the harvesting head, with the pickup and conveying rollers shown in broken lines.
Figure 4:
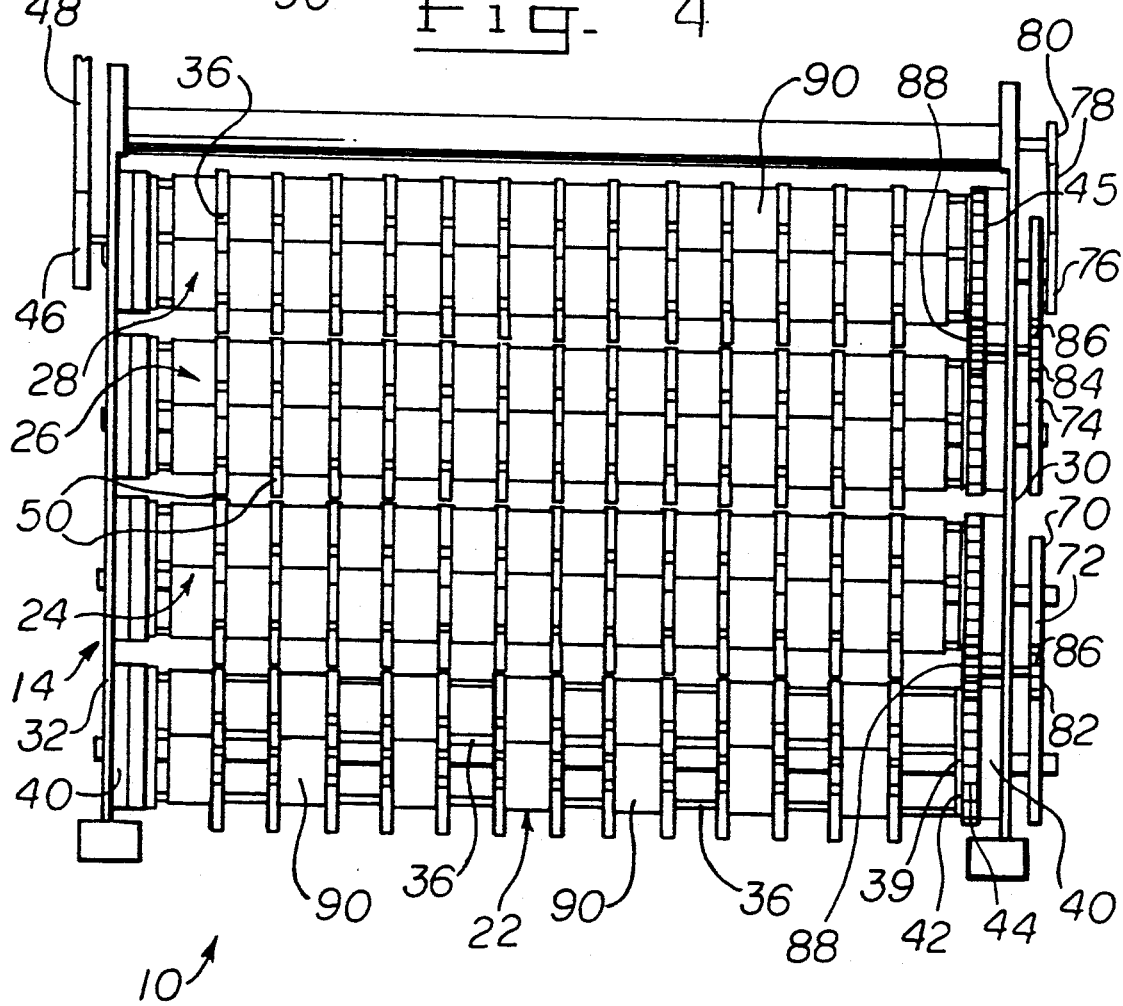
FIG. 4 is a top plan view of the harvesting head.

Turning additionally to FIGS. 2-4, the harvesting head 14 comprises rotatable rollers 22, 24, 26, and 28 which are mounted to and extend between side frame members 30 and 32. Each roller comprises an elongated cage structure 34 formed from longitudinally extending straight rods 36 and a plurality of circular reinforcing rods 38 spaced along the length of the straight rods and secured thereto. Rods 36 and 38 are preferably formed from hardened steel but other suitable materials ma also be utilized. The straight rods 36 are evenly spaced in a circular array about the periphery of the circular rods 38 to form a hexagonal structure when the cage 34 is viewed from either end. It will be appreciated that the shape of the cage may be varied, if desired, by reducing or adding to the number of straight rods utilized. The diameter of the cage may also be varied by using circular rods of greater or lesser diameter.

The cages 34 are provided with end plates 39 to which the ends of the straight rods 36 are secured. The end plates 39 have central openings and are coupled with hollow shaft extensions 39a. The shaft extensions 39a extend within collars 40 which are bolted to opposed inner faces of both side frame members 30 and 32. Suitable bearings (not shown) are fitted on the shaft extensions 39a within the collars to permit rotation of each cage about its respective longitudinal central axis.

A sprocket wheel 42 is also provided at one end of each cage 34 on shaft extension 39a between the end plate 39 and collar 40. The forward two rollers 22 and 24 are paired together by a timing chain 44 which engages the wheel 42 sprockets of those rollers. Likewise, a timing chain 45 engages the sprockets of rear rollers 26 and 28.

A suitable drive mechanism is provided for driving the rotation of the cage structures in rollers 22 and 24 independently from rotation of the cage structures of rollers 26 and 28. As one example, the paired rear cage structures may be driven by a drive sprocket wheel 46 mounted on the end of the cage of roller 28 opposite from sprocket wheel 42. A drive chain 48 engages sprocket wheel 46 and in turn is driven by a suitable mechanism (not shown) such as hydraulic motors coupled with a tractor 12 mounted PTO-drive gear pump. The paired forward cage structures 34 of rollers 22 and 24 may be driven in a like manner.

Figure 6:
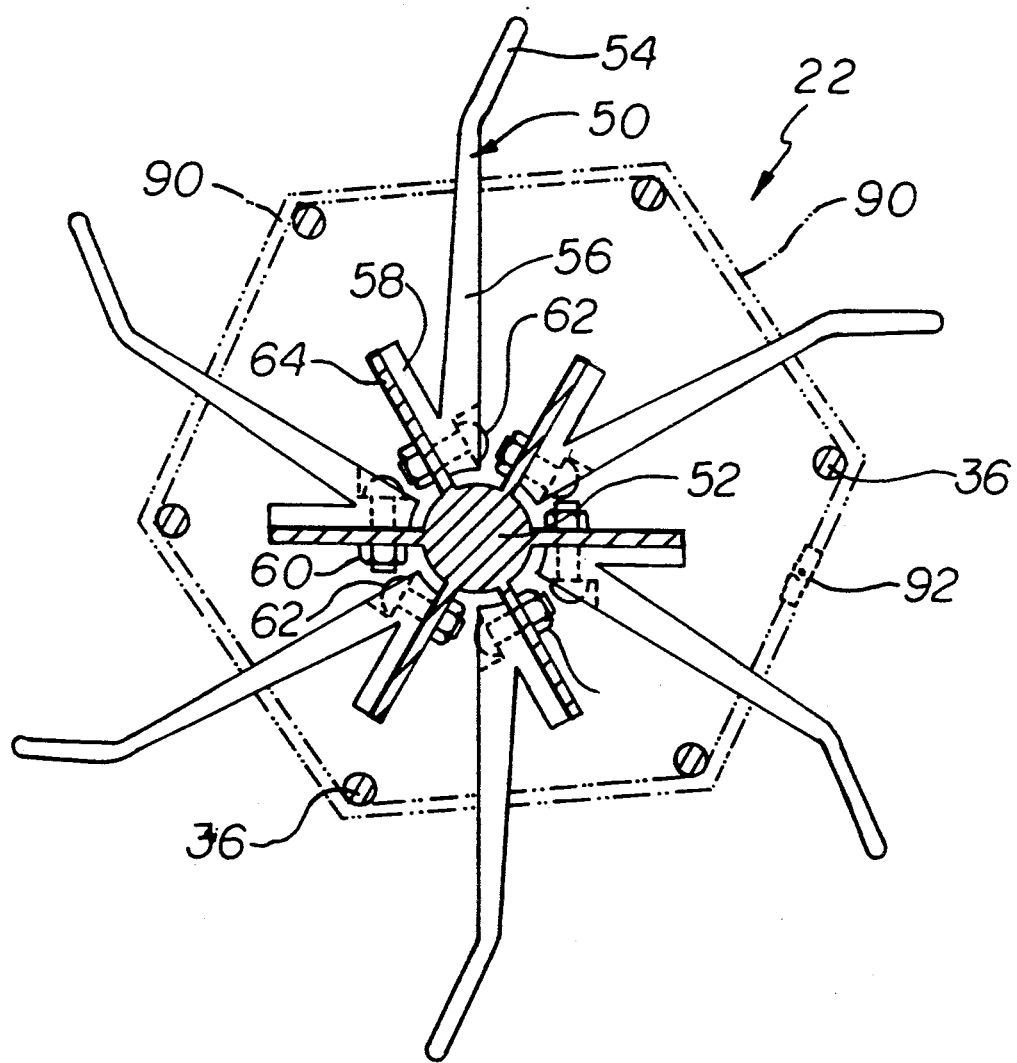
FIG. 6 is a fragmentary end elevational view of a harvesting head roller, taken in vertical cross-section and shown on an enlarged scale.

Further details of the construction of rollers 22, 24, 26 and 28 may best be seen with reference to FIGS. 2 and 6. Each roller includes a plurality of elongated fingers 50 which are mounted to a rotatable shaft 52 positioned within the associated cage 34. The fingers 50, which are formed from plastic or other suitable material, extend radially outward from shaft 52 and beyond the periphery of cage 34. Each finger includes an outer tip portion 54 which extends at an angle from a main stem portion 56. The main stem 56 of the finger is thickened at its inner end for increased stability and is tapered along its length.

Mounting of fingers 50 to shaft 52 is provided by an integral mount 58 which extends at an acute angle from the inner end of the finger stem 56. The fingers are mounted such that they define a concave surface in their direction of travel. Alternatively, it may be desired in certain applications to mount some or all of the fingers so that they present a convex surface in the direction of travel. For example, the fingers of forward roller 22 may be mounted with the concave surface in the direction of the travel and the fingers of the rollers 24, 26 and 28 mounted to present a convex surface.

Preferably, the fingers are paired together with both fingers in a pair having a common mount 58. A nut 60 and carriage bolt 62 secure the finger mount 58 to one of six mounting flanges 64 which are welded to and extend radially from shaft 52.

The six mounting flanges 64 which secure the fingers 50 to the shaft 52 extend along the length of the shaft and are evenly spaced at sixty degree intervals about the periphery of the shaft. If desired, more or fewer flanges may be provided. Mounting holes 68 are provided in the flanges to receive the finger 50 securing bolts 62. The mounting holes 68 are spaced so that the fingers 50 are arrayed in a predetermined pattern along the length of the rollers 22-28. As can best be seen in FIG. 4, the fingers 50 are evenly spaced in sets of concentric rings, each ring being evenly spaced from adjacent rings along the length of the rollers 22-28.

As is shown in FIGS. 3 and 4, the shafts 52 which mount fingers 50 are driven independently of cage structures 34. The shafts 52 extend through the cage mounting collars 40 and are connected to suitable bearings (not shown) which are mounted to side frame members 30 and 32. One end of each shaft 52 is provided with a sprocket wheel 70 which engages a timing chain 72 or 74. The shafts 52 in forward rollers 22 and 24 are paired together by chain 72 while the rear two shafts are paired by chain 74. The rear most shaft is also provided with a second sprocket wheel 76 which engages a main drive chain 78 which in turn is driven by a main drive sprocket wheel 80. A similar mechanism (not shown) may be provided to drive the forward pair of shafts.

Timing gear mechanisms 82 and 84 are also provided to time rotation of the shafts 52 with that of the associated cage structure 34. Each timing mechanism 82 and 84 comprises an outer gear 86 which engages the shaft timing chain 72 or 74. An inner gear 88 is connected to the outer gear 86 by a shaft and engages the associated cage timing chain 44 or 45 to ensure synchronized rotation of each shaft 52 with the associated cage structure 34.

As is best seen in FIGS. 4 and 6, the cage structure 34 and the finger 50 mounting shaft 52 are mounted to the side frame members such that the axis of rotation of the cage is offset from that of the shaft. Because the cage rotates independently from the offset shaft, extension of fingers 50 beyond the cage varies along the rotation arc of the cage but remains constant at any fixed point along the arc. Thus, the forward roller 22 may be mounted so that the fingers 50 achieve their maximum extension beyond the cage structure as they lift the vine mat from the ground surface. Rollers 24-28 may also be advantageously positioned so that the rotating fingers reach their maximum extension as they engage the rearwardly progressing vine mat. It will be appreciated that the rollers 22-28 may be positioned in other orientations if desired.

Returning to FIGS. 2, 4 and 6, the outer periphery of the cage structures 34 include flat bands or belts 90 which are positioned adjacent each ring of fingers in rollers 24, 26 and 28. The belts 90 may be constructed of suitably durable material such as materials commonly used for conveyor belts. Each belt 90 is tightly fitted over the cage structure 34 for rotation therewith and is provided with a fastener 92 to facilitate placement and removal of the belt. Together, the belts provide an outer covering for the cage structure to prevent passage of vines or crop through the cage structure and to facilitate conveyance of the vines and crops rearwardly.

Belts 90 are also provided on forward roller 22 adjacent alternate rings of fingers. The spacing between the belts in forward roller 22 is designed to permit soil and other debris picked up by roller 22 to pass through the cage structure instead of being transferred to the other rollers. The belt spacing on the forward roller is generally determined by the soil conditions. For example, fewer or no belts may be used on forward roller 22 under extreme mud or debris conditions. Alternately, more belts may be used if the soil conditions are favorable.

A cutter bar 94 extends laterally between frame extensions 96 and 98 in front of the forward pickup roller 22. Wheeled coulters 100 and 102 which are used for adjusting the height of harvesting head 14 are also coupled with the frame extensions 96 and 98.

Figure 5:
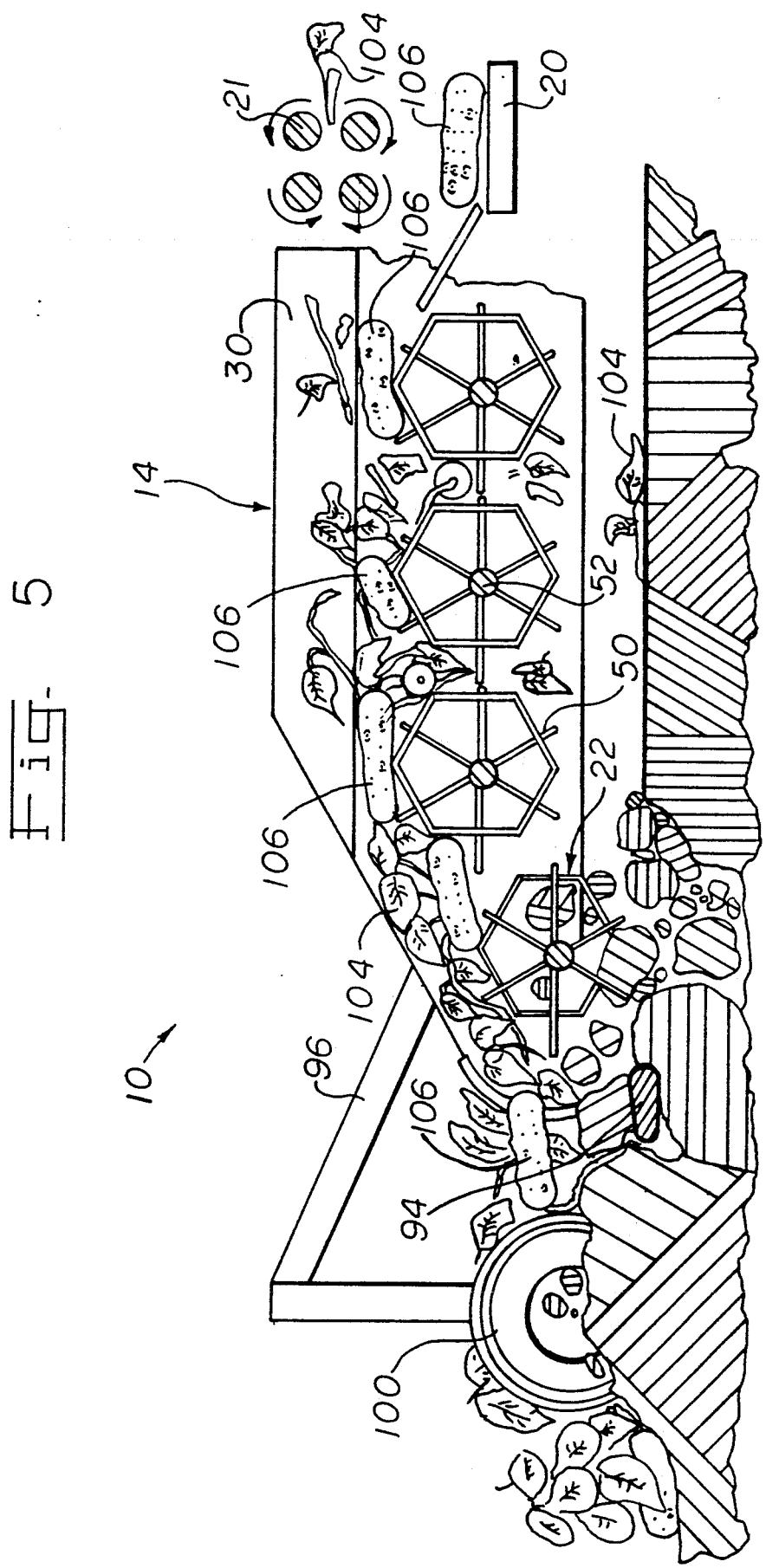
FIG. 5 is a cut away, side elevational view of a forward portion of the harvesting machine illustrating its operation when harvesting a cucumber vine crop.

The operation of the harvesting head 14 can best be seen with reference to FIG. 5. As the tractor proceeds through the field, the cutter bar 94 travels just below the ground surface to loosen and lift the vine root mass out of the ground. The fingers 50 of rotating forward pickup roller 22 lift the dislodged vine mat 104 from the ground and transfer it rearwardly to the adjacent roller 24 which rotates at the same speed as the forward roller.

The vine mat 104 and attached crop 106 are conveyed along the harvester head 14 from the forward rollers to rear rollers 26 and 28 which rotate at a faster speed than the forward rollers. The faster rotation of the rear rollers operates to thin out the vine mat so that less vine mat per unit length is presented to the pinch rollers 21 which separate the crop 106 from the vine mat 104. The pinch rollers rotate to pull the vine mat through the rollers but prevent passage of the crop because of their close spacing. The detached crop 106 then drops onto conveyor 20 for subsequent transport to hopper 18 (FIG. 1).

It will be appreciated that the harvester head 14 is capable of significantly increasing crop yields while operating with greater reliability than conventional harvester heads. Since the fingers 50 are mounted to shaft 52 which rotates about an axis offset from that of the cage structure 34, the finger extension and retraction varies along the rotation arc of the rollers but remains constant at any point along the rotation arc. The rollers 22-28 may thus be advantageously positioned to minimize crop losses. The forward pickup roller 22 is preferably positioned with the rotation axis of the shaft 52 located forward and below the rotation axis of the cage structure 34 so that fingers 50 reach their maximum extension when they contact the vine mat at the ground surface. The extended fingers spread the lifting force over a greater portion of the vine mat to reduce the incidence of dislodging of the crop from the vine mat as it is being lifted. Any crop which is dislodged may still be retained and carried upward by the fingers.

Retraction of the forward roller fingers 50 as they continue their upward rotation further reduces disruption of the vine mat by reducing the lift or transition of the vine mat as it is presented to the belts 90 on the cage structure 34. Significant crop losses are thereby avoided by this reduction in the height to which the vine mat is lifted prior to being placed on the belts.

As the fingers 50 in the forward roller 22 pass through their downward rotation arc, they begin to extend but reach their maximum extension only after they have cleared the adjacent roller 24. This permits closer positioning of the rollers than would otherwise be possible if the fingers were fully extended, thereby reducing the opportunity for the crop to fall between the rollers.

Each of rollers 24, 26 and 28 is preferably mounted so that the fingers 50 are fully extended as they lift the vine mat from the adjacently positioned roller. To achieve this positioning, the rotation axis of the shaft 52 in each roller 24-28 is positioned forward of the rotation axis of the associated cage structure 34. Maximum extension of the fingers as they engage the vine mat provides an efficient method of transporting and thinning the vine mat while significantly reducing crop losses between the rollers.

It is particularly notable that the finger 50 extension and retraction is achieved even though the fingers 50 are fixedly secured to shaft 52. The shaft 52 and cage structure 34 each independently rotates about its respective longitudinal central axis to provide the finger extension without the use of bearings or cams and bushings which are prone to break down under the operating conditions encountered by the harvester head 14. The fixed fingers thus provide reliable service with a minimum of maintenance.

The spaced apart and removable belts 90 on the forward roller 22 are also particularly advantageous by permitting the roller to be quickly adapted to differing field conditions. If the soil in the field is wet, the spacing between the belts may be increased to permit the soil picked up with the vine roots to fall through the roller rather than being passed to the adjacent roller 24. On the other hand, if the soil conditions are relatively dry or sandy, it may be desired to reduce the spacing between the belts to reduce the opportunity for crop loss through the roller. The belts 90 are thus readily positioned to maximum crop yield while reducing the quantity of soil carried onto the adjacent rollers It will be seen from the foregoing that this invention is one well adapted to attain all of the ends and objects hereinabove set forth together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A harvester adapted for picking up a vine mat having a crop such as cucumbers attached thereto and then separating the crop from the vine mat, said harvester comprising:
    a pickup roller at a forward end of the harvester, said pickup roller comprising an elongated cage having an outer periphery and mounted for rotation about a longitudinal axis, a shaft extending longitudinally within said cage and mounted for rotation about an axis offset but parallel to the rotation axis of said cage, and a plurality of elongated fingers coupled with the shaft for rotation therewith, said fingers being of a length to extend radially outward beyond the cage periphery during at least a portion of each revolution of the cage and shaft, whereby said fingers are adapted for lifting said vine mat onto the pickup roller during operation thereof; and
    means spaced rearwardly from the pickup roller for separating the crop from the vine mat.

2. The invention of claim 1, including means for synchronizing the rotation of said shaft and said cage.

3. The invention of claim 1, wherein said means for separating the crop from the vine mat includes rollers spaced rearwardly from the pickup roller for conveying and thinning of the vine mat.

4. The invention of claim 3, wherein said means for separating the crop from the vine mat includes rotatable pinch rollers positioned for receiving the thinned vine mat, said pinch rollers being closely spaced to prevent passage of the crop but permitting passage of the other portions of the vine mat.

5. The invention of claim 1, wherein said cage comprises a plurality of longitudinally extending rods positioned in a generally circular array when viewed in a cross-sectional plane taken generally transverse to the longitudinal axis of the cage.

6. The invention of claim 5, including a plurality of belts circumscribing the periphery of the cage and spaced apart along the longitudinal rods of the cage.

7. The invention of claim 1, including a plurality of flanges extending radially from said shaft and mounting said fingers.

8. The invention of claim 1, wherein the longitudinal rotation axis of the cage is coincident with a central longitudinal axis of the cage.

9. The invention of claim 8, wherein the rotation axis of the shaft is coincident with a central longitudinal axis of the shaft.

10. A roller adapted for mounting with a vine crop harvesting head, said roller comprising:
    an elongated cage structure rotatable about a longitudinal axis;
    a shaft within said cage structure and rotatable about an axis generally parallel to but offset from the longitudinal axis of the cage structure; and
    a plurality of finger elements rigidly mounted to said shaft and extending outward through and beyond an outer periphery of said cage structure,
    whereby extension of said finger elements beyond the periphery of the cage structure during rotation of the cage structure and shaft varies along a rotational arc of the cage structure.

11. The invention of claim 10, wherein said longitudinal axis about which the cage structure rotates is coincident with a central longitudinal axis of the cage structure.

12. The invention of claim 11, wherein said rotation axis of the shaft is coincident with a central longitudinal axis of the shaft.

13. The invention of claim 12, wherein rotation of said shaft is timed with rotation of said cage structure.

14. The invention of claim 10, wherein said cage structure comprises a plurality of longitudinally extending rods arrayed in a circular pattern when viewed in a cross-sectional plane taken generally transverse to the longitudinal axis of the cage structure.

15. The invention of claim 14, including a plurality of belts circumscribing the periphery of said cage structure and spaced apart along the longitudinal rods of the cage structure.

* * * * *